{ United States Patent [19] | [11] Patent Number: 4,692,353 }
{ Ahmed | [45] Date of Patent: Sep. 8, 1987 }

[54] METHOD OF INHIBITING DEGENERATION OF DIRECT REDUCED IRON

[75] Inventor: Jaleel K. Ahmed, Babylon, Iraq

[73] Assignee: Ministry of Industry & Minerals Specialized Institute for Engineering Industries, Baghdad, Iraq

[21] Appl. No.: 567,782

[22] Filed: Jan. 3, 1984

[51] Int. Cl.⁴ ............................................. B05D 7/00
[52] U.S. Cl. ................................... 427/216; 427/156; 427/318; 427/398.1; 427/435; 427/443; 427/443.2
[58] Field of Search ................. 427/443.2, 398.1, 443, 427/435, 318, 216, 156

[56] References Cited

U.S. PATENT DOCUMENTS

| | | | |
|---|---|---|---|
| 46,384 | 2/1865 | Pratt | 427/443 |
| 842,758 | 1/1907 | Brown | 427/435 |
| 1,290,952 | 1/1919 | Finlay et al. | 427/443 |
| 1,466,380 | 8/1923 | Nusbaum | 427/435 |
| 1,592,459 | 7/1926 | Heany | 427/443 |
| 2,294,154 | 8/1942 | Barthelemy et al. | 427/435 |
| 3,258,319 | 6/1966 | Cox | 427/435 |
| 3,300,329 | 1/1967 | Orsino et al. | 427/216 |
| 3,407,089 | 10/1968 | Sampson et al. | 427/216 |
| 4,407,864 | 10/1983 | Stift et al. | 427/216 |
| 4,430,132 | 2/1984 | Painter | 427/216 |

*Primary Examiner*—Norman Morgenstern
*Assistant Examiner*—Janyce A. Bell
*Attorney, Agent, or Firm*—Poms, Smith, Lande & Rose

[57] ABSTRACT

A method of inhibiting degeneration of direct reduced iron by immersing the iron ore, after it has been reduced, in molten wax for a period of time sufficient for the wax to cover completely the surface of the iron and to enter the pores in the surface of the iron.

The iron is preferably in the form of pellets which are conveyed in mesh baskets which are themselves immersed in the wax.

The wax is preferably paraffin wax at a temperature of between 110° and 120° C.

14 Claims, 1 Drawing Figure

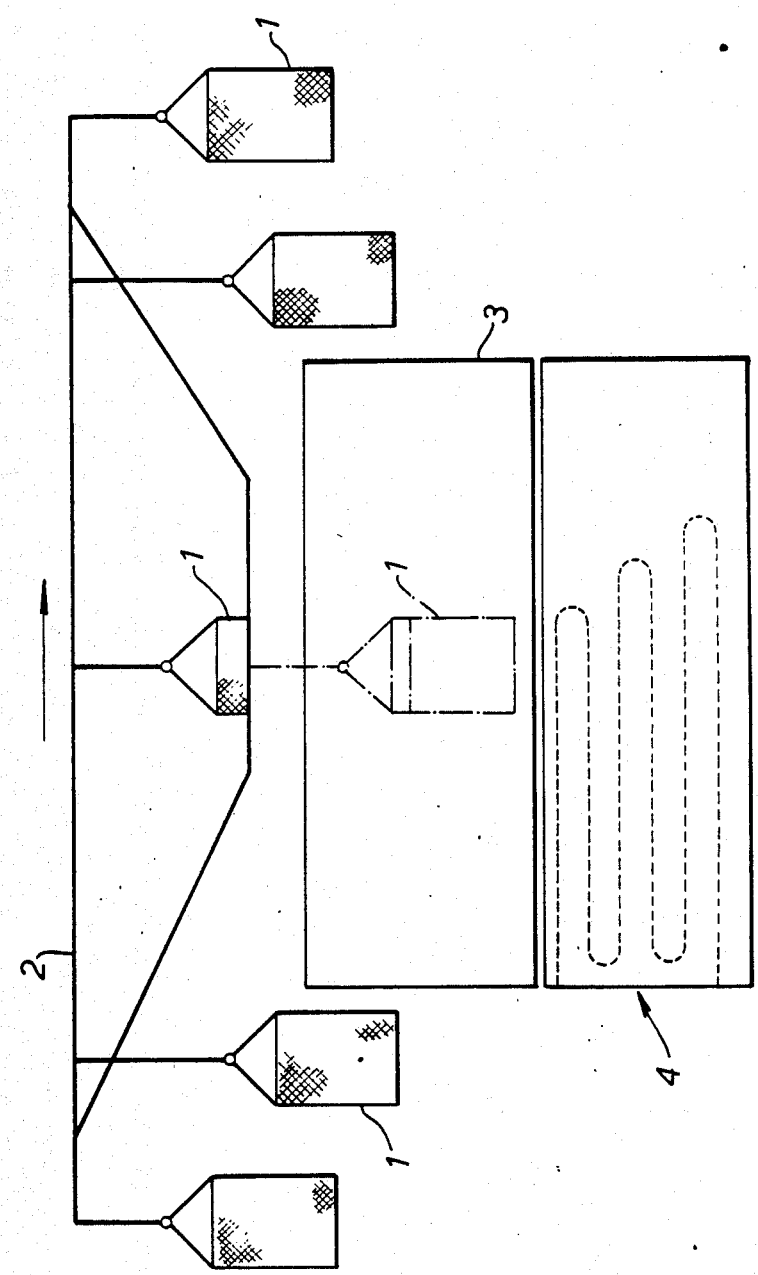

METHOD OF INHIBITING DEGENERATION OF DIRECT REDUCED IRON

This invention relates to a method of inhibiting degeneration of direct reduced iron.

Direct reduced iron (DRI) is a comparatively new cargo that has already presented problems when shipped in bulk. It is made from iron ore pellets which are chemically reduced to yield metallic iron and, as a result of this process, it has a porous or sponge-like structure. For this reason, it has sometimes been called sponge iron.

With its sponge-like structure, DRI has a very large surface area per unit weight. Consequently, it is chemically reactive and this makes it dangerous to store or ship in bulk. All DRI has some common characteristics which are independent of the particular direct reduction process. These common characteristics effect shipping, storage and handling and are mainly related to re-oxidation and corrosion behaviour. Re-oxidation of DRI can occur in the dry state and is the reaction of oxygen from air with metallic iron to form iron oxide, accompanied by generation of heat and, if this were continued, would start to burn. A fire in a bulk stow is extremely difficult to control. Corrosion of DRI occurs only when it is wetted with water in the presence of air and is a result of the reaction of water and oxygen from air with the metallic iron to form rust. This reaction is accompanied by generation of heat as well as a small amount of hydrogen which, of course, can form dangerously explosive mixtures with air. Both the re-oxidation and corrosion reactions take place slowly over a matter of hours or days.

One known method of inhibiting degeneration of DRI is where the DRI is immersed in a dilute aqueous solution of a certain chemical, is then dired in a tower using hot inert gas and followed by cooling in another tower using cool inert gas. A solid film which has coated the DRI pellets can break or crack easily during charging and discharge of the pellets so that the surfaces of the pellets become exposed again to the atmosphere. Also, the solid film produced by this method can be washed out with water so that the problem of re-oxidation will appear again. A further disadvantage is that the coated pellets consume more electrical energy and expend more graphite electrodes when the coated pellets are melted in an electric arc furnace than is the case with uncoated pellets.

Another known method of inhibiting degeneration of DRI is where the pellets are crushed to fine particles by mechanical mills and then water, molasses and lime are added in certain quantities, the resulting paste being conveyed to a machine to make briquettes out of the paste. In this case, there is the disadvantage that the method involves many mechanical steps which makes it complicated and, once formed, the surfaces of the briquettes are easily reoxidised, this resulting in reduction of the degree of metallisation of the iron. Furthermore, DRI in the form of briquettes consumes more electrical energy and expends more graphite electrodes when melted in an electric arc furnace as compared with an equivalent weight of DRI in the form of pellets.

According to the present invention, there is provided a method of inhibiting degeneration of direct reduced iron by immersing the iron ore, after is has been reduced, in molten wax for a period of time sufficient for the wax to cover completely the surface of the iron and to enter the pores in the surface of the iron.

Preferably, the wax used is paraffin wax and preferably the temperature of the molten wax is between 110° and 120° C.

For a better understanding of the invention and to show how the same may be carried into effect, reference will now be made, by way of example, to the accompanying drawing, in which the single FIGURE is a diagrammatic view of apparatus for carrying out a method in accordance with the invention of inhibiting degeneration of direct reduced iron.

With the present method, DRI is transferred from the final stage, which is the cooling stage, in the reduction process at a temperature of about 90°–100° C. to a vessel containing molten paraffin wax at a temperature of about 110°–120° C. Since the DRI is in the form of pellets, it is transferred from the final stage of the reduction process in mesh baskets 1 having a mesh smaller than the average diameter of the pellets. The baskets 1 are conveyed on a conveyor 2 and are immersed in the molten paraffin wax which is contained in a vessel such as a steel or aluminium tank 3. The tank 3 is fitted with an electrical heater and temperature control device 4.

With the above mentioned temperatures of the DRI and of the wax, the optimum immersion time in the wax of the pellets is 3 to 5 seconds, the amount of wax being consumed being 5–6 percent by weight. The quantitiy of wax consumed in this method depends on the temperature of the wax, the temperature of the DRI, the time of immersion of the DRI in the wax and the porosity of the DRI.

It has been found that the wax fills the pores in the pellets, thus expelling any dissolved gases in the pellets (which gases could have harmful effects on the physical properties during the manufacture of steel and iron from DRI) and, during the melting processes of the DRI in an electric arc furnace, the wax surrounding the pellets burns to form non-oxidising gases which protect the graphite electrodes of the furnace from oxidation. The burning of the wax in this process also liberates heat which results in a reduction in the electrical power consumption. Furthermore, since wax is chemically inactive even at elevated temperatures and has a high flash and fire point and a low melting temperature, these characteristics are of good advantage to the present method but, since the wax is burnt when the DRI is being further processed, no materials are left as a result after the burning of the wax which could contaminate the molten iron in the electric arc furnace.

Various tests were carried out on DRI pellets that have been treated according to the present method, these tests checking the efficiency of the present method for inhibiting reoxidation and corrosion of DRI and the results are as follows.

1. No heat was generated in the treated DRI samples after spraying with a 5% sodium chloride solution, which indicates that no corrosion had taken place.

2. There was no change in the weight of DRI samples after immersion in water for half an hour, which indicates that the wax filled all of the exterior pores of the pellets and thus prevented water from contacting the surfaces of the pellets.

3. There was no gain or loss in the weight of DRI samples after heating up to 150° C. for half an hour in an air jet oven, which indicates that no re-oxidation took place as well as there having been no loss in the quantity of wax.

4. No iron dust was found after a treated DRI sample had been rotated in a drum, which indicates that in addition to inhibiting re-oxidation and corrosion, the wax suppresses dust liberation handling of the treated product and also makes the product more resistant to breakage during handling.

5. No damaging effects were found on the furnace or its lining after several melting experiments of treated DRI samples in the electric arc furnace.

6. There were no substantial changes in the metallisation of treated DRI samples as compared with untreated samples after several sprayings with 5% sodium chloride solution, both the treated DRI samples and the untreated DRI samples then being left exposed to the outside atmosphere for five months, whereafter they were sent for chemical analysis. In the table below, the degree of metalisation is expressed as a percentage ratio of free iron to total iron. The degree of metallisation in the starting material (untreated DRI) was 84%.

|  | treated | untreated sample |
| --- | --- | --- |
| total iron % | 79.9 | 74.5 |
| free iron % | 62.3 | 24.5 |
| iron oxide % | 17.6 | 39.8 |
| metallisation % | 78.0 | 32.9 |

Thus, it will be seen that, with the present invention, the shipping, distribution and storage of DRI is facilitated without the necessity of keeping the material dry at all stages of the handling whilst making the DRI both oxidation and corrosion resistant.

I claim:

1. A method of processing iron ore, the method comprising:
    directly reducing iron ore to form porous or spongy direct reduced iron (DRI) material;
    immersing said DRI material in molten wax to impregnate said material while the material is still hot from the direct reduction process and prior to reoxidation or other deterioration thereof; and
    removing the DRI material from the molten wax, allowing wax to drain from the exterior surface of the DRI material, and permitting the wax within the pores of the DRI material to cool and harden, whereby the DRI material is protected against oxidation or other deterioration under adverse conditions.

2. A method as claimed in claim 1, in which said wax is paraffin wax.

3. A method as claimed in claim 1, wherein the temperature of the molten wax is between 110° and 120° C.

4. A method as claimed in claim 1, wherein the iron ore is at a temperature of between 90° to 100° C. at the time of immersion.

5. A method as claimed in claim 1, wherein the iron ore is in the form of pellets.

6. A method as claimed in claim 5, wherein the pellets are retained in mesh baskets having a mesh smaller than the average diameter of the pellets, the baskets being conveyed on a conveyor and being immersed in the molten wax which is contained in a vessel.

7. A method as claimed in claim 1, wherein said period of time is between 3 to 5 seconds.

8. A method of processing iron ore comprising the steps of:
    directly reducing pellets of iron ore to form metallic iron in the form of porous or sponge-like pellets;
    removing the pellets from the direct reduction process while the pellets are still at a substantial elevated temperature above room temperature;
    placing the pellets of directly reduced iron in mesh baskets having mesh openings smaller than the size of the pellets.
    immersing the DRI pellets in the mesh baskets into tanks of molten wax to coat and impregnate the porous pellets, the foregoing step being accomplished while the pellets are still hot from the direction reduction process, before the pellets have cooled down, and prior to re-oxidation or other degeneration of the DRI pellets;
    removing the coated DRI pellets from the molten wax and permitting the wax to cool and harden thereby coating the DRI pellets and permeating the pores thereof;
    subsequently shipping the wax coated pellets to the point of final use of the pellets;
    whereby deterioration of the DRI pellets during shipment is inhibited or substantially prevented.

9. A method as claimed in claim 8 in which said wax is paraffin wax.

10. A method as claimed in claim 8 wherein the temperature of the molten wax is between 110° and 120° C.

11. A method as claimed in claim 8 wherein the iron ore is at a temperature of between 90° to 100° C. at the time of immersion.

12. A method as defined in claim 8 wherein said DRI pellets are immersed in said molten wax for approximately 3 to 5 seconds.

13. A method of processing iron ore comprising the steps of:
    directly reducing iron ore to form porous or spongy DRI material pellets;
    immersing said DRI material in molten wax to impregnate said material while the pellets are still hot from the direct reduction process, before the pellets have cooled down, and prior to re-oxidation or other deterioration thereof;
    removing the DRI material from the molten wax and permitting the wax to cool and harden, thereby coating the DRI material and permeating the pores thereof; and
    protecting the DRI material against oxidation or other deterioration under possible adverse conditions by maintaining the DRI material coated and impregnated with wax.

14. A process as defined in claim 13 wherein the immersing step is accomplished using wire mesh baskets permitting free flow of wax through the baskets to the DRI material.

* * * * *